United States Patent [19]
Manico et al.

[11] Patent Number: 5,289,229
[45] Date of Patent: Feb. 22, 1994

[54] FULL FRAME/PANORAMIC PHOTOGRAPHIC PRINTING APPARATUS AND METHOD

[75] Inventors: Joseph A. Manico, Rochester; William L. Burnham, Leroy, both of N.Y.

[73] Assignee: Eastman Kodak Company, Rochester, N.Y.

[21] Appl. No.: 952,560

[22] Filed: Sep. 28, 1992

[51] Int. Cl.$^5$ .............................................. G03B 27/52
[52] U.S. Cl. ...................................... 355/41; 250/561
[58] Field of Search ....................... 355/41, 38, 50, 68; 250/559, 548, 561, 208.1, 571

[56] References Cited

U.S. PATENT DOCUMENTS

| | | | |
|---|---|---|---|
| 3,490,844 | 1/1970 | Sapp, Jr. | 355/40 |
| 4,135,810 | 1/1979 | Walter | 355/29 |
| 4,218,133 | 8/1980 | Bierdermann | 355/56 |
| 4,650,316 | 3/1987 | Matsumoto | 355/55 |
| 4,719,494 | 1/1988 | Shiota | 355/77 |
| 4,727,399 | 2/1988 | Matsumoto | 355/41 |
| 4,728,996 | 3/1988 | Matsumoto | 355/77 |
| 4,769,679 | 9/1988 | Matsumoto | 355/41 |
| 4,777,515 | 10/1988 | Aikoh et al. | 355/64 |
| 4,864,149 | 9/1989 | Matsumoto | 250/561 |
| 5,151,726 | 9/1992 | Iwashita et al. | 354/75 |
| 5,159,386 | 10/1992 | Taniguchi et al. | 355/38 |
| 5,204,707 | 4/1993 | Harvey | 354/75 |

*Primary Examiner*—Richard A. Wintercorn
*Attorney, Agent, or Firm*—Frank Pincelli

[57] ABSTRACT

A photographic printing apparatus for processing both full frame and panoramic prints from a roll of film containing negatives which have been selectively exposed in either full frame format or panoramic format is disclosed herein, along with its method of operation. The apparatus includes a printing station for receiving successively exposed negatives from the roll of film and an arrangement for electro-optically determining the density of each negative within the printing station at a number of sensing points on the negative. A format status determining arrangement, preferably one which is computerized, responds to the density of the given negative at the various sensing points for determining if the negative contains a full frame image or a panoramic image, or is blank or entirely fogged. If the particular negative at the printing station is determined to contain a full frame image, the printing apparatus makes a print from the negative in the full frame format and if it is determined that the negative contains a panoramic image, the print in made in the panoramic format. On the other hand, if the negative is determined to be a blank or entirely fogged, the apparatus moves that negative out of the print station without making a print.

10 Claims, 2 Drawing Sheets

FULL FRAME/PANORAMIC PHOTOGRAPHIC PRINTING APPARATUS AND METHOD

BACKGROUND OF THE INVENTION

1. Field of the Invention

The present invention relates generally to a photographic printer and its method of operation, and more particularly to a specific photographic printing apparatus for automatically processing both full frame and panoramic prints from a roll of film containing negatives which have been selectively exposed in either full frame or panoramic format.

2. Description of the Prior Art

Panoramic photos are becoming very popular as a result of the Kodak Funsaver Panoramic camera. This is a single use camera with a short focal length lens and masks which block light from reaching the film in the upper and lower portions of the standard 24 mm by 36 mm film frame. Thus, the exposed area is over two times wider than it is tall. This requires special photofinishing with a narrower negative mask, a greater magnification and a wider paper aperture. The film is sorted at the photofinisher by written instructions on the camera housing or by the visible cue of the narrow exposed area on the negative. This operation is not automated.

Other reusable cameras are now on the market which produce similar negatives and, in each of these cases, the entire roll is exposed in panoramic format. Typically, labels are supplied for the photographer to apply to the film cartridge to help identify it as a roll of panoramic exposures. The same photofinishing process is used for these exposures.

A number of camera manufacturers are considering introducing cameras which allow the user to switch from full frame to panoramic format or back at any time. The result will be a mixture of full frame exposures and panoramic exposure on one roll of film. This will be difficult for the photofinisher to handle with existing equipment, which, in turn, will cause delays and result in significant added cost.

SUMMARY OF THE INVENTION

In order to overcome the problems associated with the introduction of cameras capable of switching back and forth between full frame and panoramic formats, the present invention provides for a technique for processing automatically both full frame and panoramic prints from a roll of film containing negatives which have been selectively exposed in either full frame or panoramic format. As will be described in more detail hereinafter, this technique is incorporated into the apparatus disclosed herein, which apparatus includes means defining a printing station for receiving a given negative and means for electro-optically determining the density of the given negative at a number of sensing points on the negative when the latter is at the printing station. The apparatus also includes format status determining means responsive to the density of the given negative at the sensing points for determining if the negative contains a full frame image or a panoramic image, or is blank or entirely fogged and therefore contains no image, depending upon the density of the given negative at the sensing points. If it is determined that the given negative contains a full frame image the printing apparatus provides means for automatically making a print from the negative in the full frame format, or if it is determined that the negative contains a panoramic image, the same means will make a print in the panoramic format. On the other hand, if the negative is determined to be a blank or entirely fogged, means are provided for automatically moving the negative out of the print station without making a print.

Thus, the present invention provides a photographic printing apparatus which is capable of automatically distinguishing between full frame and panoramic images from a single roll of film, and specifically an apparatus which uses this information for providing both full frame and panoramic prints automatically.

DETAILED DESCRIPTION OF THE PREFERRED EMBODIMENT

Figure 1:
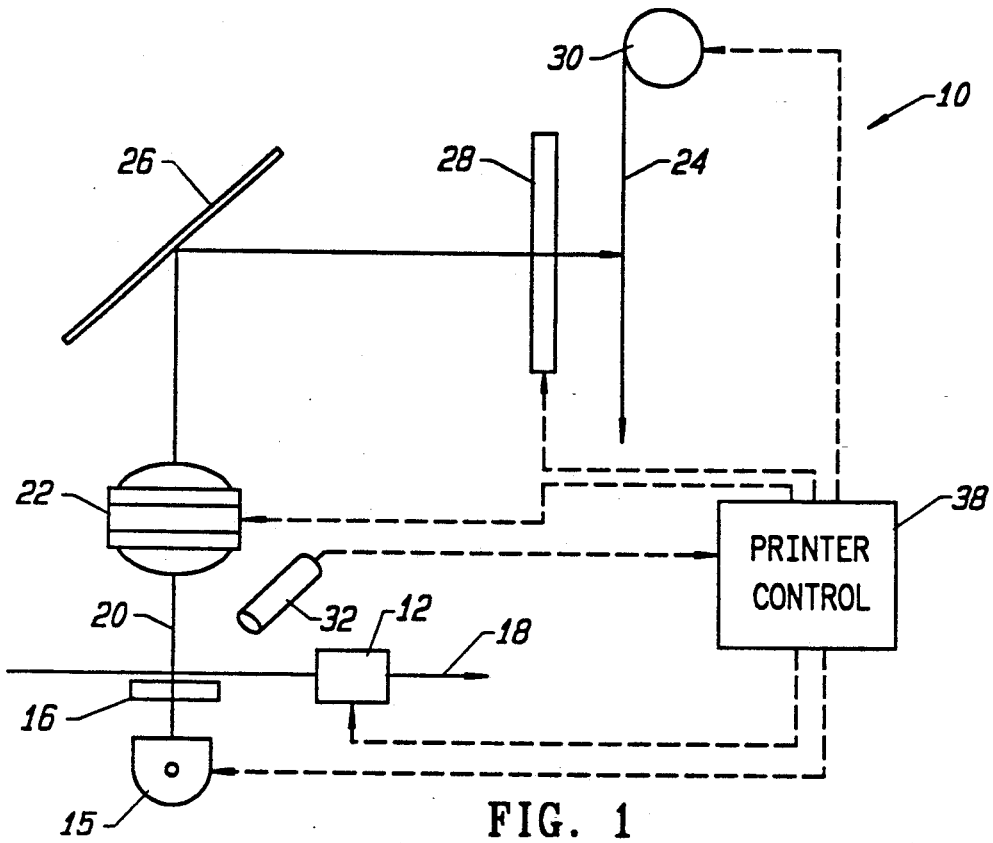
FIG. 1 is a diagrammatic illustration of a photographic printing apparatus which is designed in accordance with the present invention for processing both full frame and panoramic prints from a roll of film containing negatives which have been selectively exposed in either full frame or panoramic format.
Figure 2:
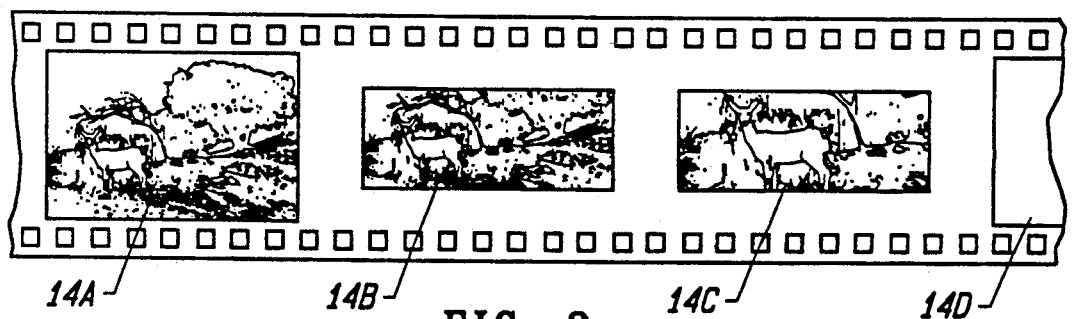
FIG. 2 diagrammatically illustrates negatives from a roll of film, which negatives have been selectively exposed in full frame and panoramic formats.

Turning now to the drawings, attention is first directed to FIG. 1 which, as stated previously, diagrammatically illustrates a photographic printing apparatus designed in accordance with the present invention. This apparatus, which is generally designated by the reference numeral 10, includes suitable means generally indicated at 12 for moving a series of successive exposed negatives 14a, 14b, 14c and so on (see FIG. 2) through a printing station generally indicated at 16, as indicated by arrow 18. As illustrated in FIG. 2, the exposed film shown there includes a mixture of full frame and panoramic exposures. Note specifically that the full frame exposures illustrated, specifically negatives 14a and 14d, are substantially larger widthwise than the panoramic negatives 14b and 14c. In fact, in an actual embodiment, the standard full frame exposure is 24 mm by 36 mm while the panoramic exposure is 12 mm by 36 mm.

Each of the negatives 14 is successively positioned within printing station 16 and held there, in a stationary manner, by means 12 for a period of time sufficiently long to allow the apparatus to determine whether that particular negative contains a full frame or panoramic image or is a blank or entirely fogged and therefore contains no image, in the manner to be described hereinafter. If it is determined that the negative is a blank or is entirely fogged, means 12 moves that negative out of printing station 16 and moves the next successive negative into the station. If, on the other hand, it is determined that the negative in the printing station contains either a full frame image or a panoramic image, apparatus 10 makes the appropriate print from the negative.

To that end, an appropriate light source 15 is provided adjacent station 16 so as to direct an exposure beam 20 through the particular negative being processed, as illustrated in FIG. 1. The beam is acted on by a cooperating lens 22 which serves to focus the image from the negative onto an awaiting section of photographic paper 24 off of a stationary mirror 26 and through a cooperating paper mask 28.

Figure 3:
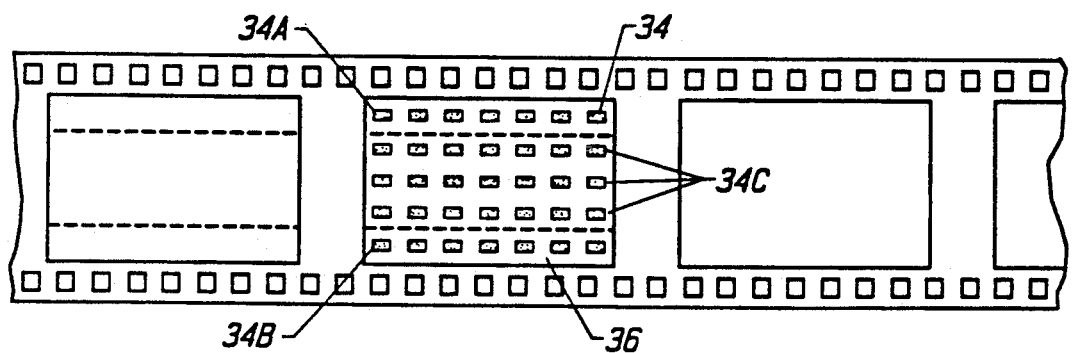
FIG. 3 diagrammatically illustrates the positional relationship between a particular exposed negative to be processed (printed) by the printing apparatus depicted in FIG. 1 and an array of density sensing points on the negative, which sensing points are used to determine whether the negative contains a full frame or panoramic image or is a blank or entirely fogged and therefore contains no image.

In addition to the components thus far described, overall photographic printing apparatus 10 includes a conventional and readily providable classification scanner 32 which includes its own multispot sensor positioned relative to print station 16 so as to sense the density of a negative within the print station at an array of points or spots 34, simultaneously. The positional relationship of these spots are illustrated in FIG. 3 where the spots are shown superimposed over a negative 36 when the latter is in print station 16. One of the functions of classification scanner 32 is to determine whether or not the negative being processed at station 16 contains an image or is a blank or entirely fogged, and therefore does not contain an image. To this end, the multispot sensor forming part of the scanner measures the density of the negative at each of the density sensing spots 34 and produces corresponding electrical signals at its output. These signals are input to a printer controller 38 which includes the appropriate circuitry and algorithm to process the signals and determine from the information so processed whether the negative contains an image, is a blank or entirely fogged. One known way to accomplish this, using the appropriate algorithm, is to compare to one another the densities at the various spots 34. If the densities are equal within a predetermined insignificant difference, it will be concluded that the negative contains no image and therefore must either be a blank or entirely fogged. On the other hand, if significant differences are found between any two spots, it will be concluded that the negative does, indeed, include an image. Assuming that the former is found, that is, that the negative contains no image, printer control 38 includes means interconnected with negative drive means 12 for moving that negative out of the print station without making a print and moving the next successive negative into the station. On the other hand, if it is determined that the negative at the station includes an image, printer control 38 includes means connected with lamp 15 and with means 30, as well as with means 12, for first processing (i.e., exposing) a print from that negative and then moving the negative so processed out of the print station so that a new negative can be positioned therein.

Photographic printing apparatus 10, as described thus far, is conventional and, in fact, is embodied in a Noritsu 1201 Automatic Minilab Printer which is presently available. Thus, the Noritsu Minilab Printer includes the various components described to automatically print good negatives (those containing images) and pass on bad negatives (those which are blank or entirely fogged). However, arrangement 10, as described thus far, is not capable of automatically distinguishing between good negatives which are to be printed in full frame format from a given roll of film from those good negatives which are to be printed in panoramic format from the same roll. This is equally true for the Noritsu 1201 Automatic Minilab Printer. Thus, neither apparatus 10, as described thus far, nor the Noritsu printer is capable of efficiently processing a roll of film containing negatives which have been selectively exposed in either full frame or panoramic format. As will be seen below, photographic printing apparatus 10 which will be described in more detail below does, indeed, differ from conventional photographic printing apparatus and from the Noritsu printer in particular in that it is capable of efficiently and automatically distinguishing between full frame and panoramic images and for efficiently and automatically printing both types of negatives from a single roll of film.

Returning to FIG. 1, apparatus 10 differs from a conventional printing apparatus in the following ways. First, its lens 22 is a conventional and readily providable zoom lens which is suitably and readily connected with printer control 38 for movement between a full frame format magnification state and a panoramic format magnification state by the printer controller. In a similar manner, the paper mask 28 is of a conventional and readily providable type which is also connected to the printer control for movement by the printer control between a first condition in which its opening corresponds to the full frame format and a second condition in which its opening corresponds to a panoramic format. Photographic paper dispensing means 30 is also connected to the printer control and is configured so as to be able to dispense different lengths of paper depending upon whether a full frame or panoramic image is being printed, as instructed by printer control 38. These various features just described, that is, the 300 m lens 22, paper mask 28 and paper dispensing means 30 are physically incorporated into the Noritsu printer, but not for the purpose of processing negatives in both full frame and panoramic formats, as in the present invention. Rather, the Noritsu printer is designed to process an entire roll of film in different formats including full frame and panoramic formats. Noritsu has no means for distinguishing between these latter two formats within a single roll of film.

In addition to the differences described immediately above, arrangement 10 differs from the prior art in the following important way. Printer control 38 has been designed to include software which acts on the multispot density information provided by classification scanner 32 in a way that allows the printer control to distinguish a negative containing a full frame image from a negative containing a panoramic image and for processing each appropriately. This is accomplished by incorporating the appropriate software into the printer control, which software is illustrated by means of the flowchart illustrated in FIG. 4, as will be discussed in more detail below.

Having described overall photographic printing apparatus 10, attention is now directed to the way in which it processes both full frame and panoramic prints from a roll of film containing negatives which have been selectively exposed in either full frame or panoramic format. To this end, reference is made to FIG. 4 in conjunction with FIGS. 1-3. However, at the outset, attention is initially directed to FIG. 3 in particular. As seen there, the array of density measuring spots 34 are arranged in three groups, a first or upper group 34a consisting of the top row of spots 34, a second or lower group 34b consisting of the bottom row of spots, and a third or intermediate group 34c consisting of the three central rows of spots. Thus, spots 34a extend entirely across a top edge segment of the negative, spots 34b extend entirely across a bottom edge segment of the negative, and spots 34c extend entirely across the negative between the upper and lower edge segments.

Having described the way in which density measuring spots 34 are divided up on a negative within station 16, attention is directed to the way in which apparatus 10 functions. As soon as a new negative is moved into printing station 16, classification scanner 12 determines the density of the negative at the various points 34, as indicated by block 40 of the flow diagram depicted in FIG. 4. The various electrical signals representing these different densities are fed to printer control 38 which compares the signals, thereby comparing the various density spots, as indicated by block 42 in FIG. 4. If the maximum density difference between any two spots is not greater than a preselected insignificant difference $\Delta$, then printer control 38 concludes the negative is a blank or entirely fogged and directs means 12 to move to the next negative without processing a print, as indicated by boxes 44 and 46 of the flow diagram. On the other hand, if the maximum difference is greater than $\Delta$, then printer control 38 concludes that the negative contains an image and compares all of the density spots in the top group 34a and all of the density spots in bottom group 34b, as indicated by block 48. If the density difference between any of these spots is no greater than $\Delta$, then printer control 38 concludes that the image panoramic and prints the negative in the panoramic format, as indicated by blocks 50 and 52. This means that the printer control must place the zoom lens 22 and the paper mask 28 in their panoramic formats and that the appropriate length of photographic paper 24 must be dispensed from means 30. Thereafter, the printer control causes lamp 15 to make the print and finally causes means 12 to move the processed negative out of the printing station while it simultaneously moves the next successive negative into the printing station.

Figure 4:
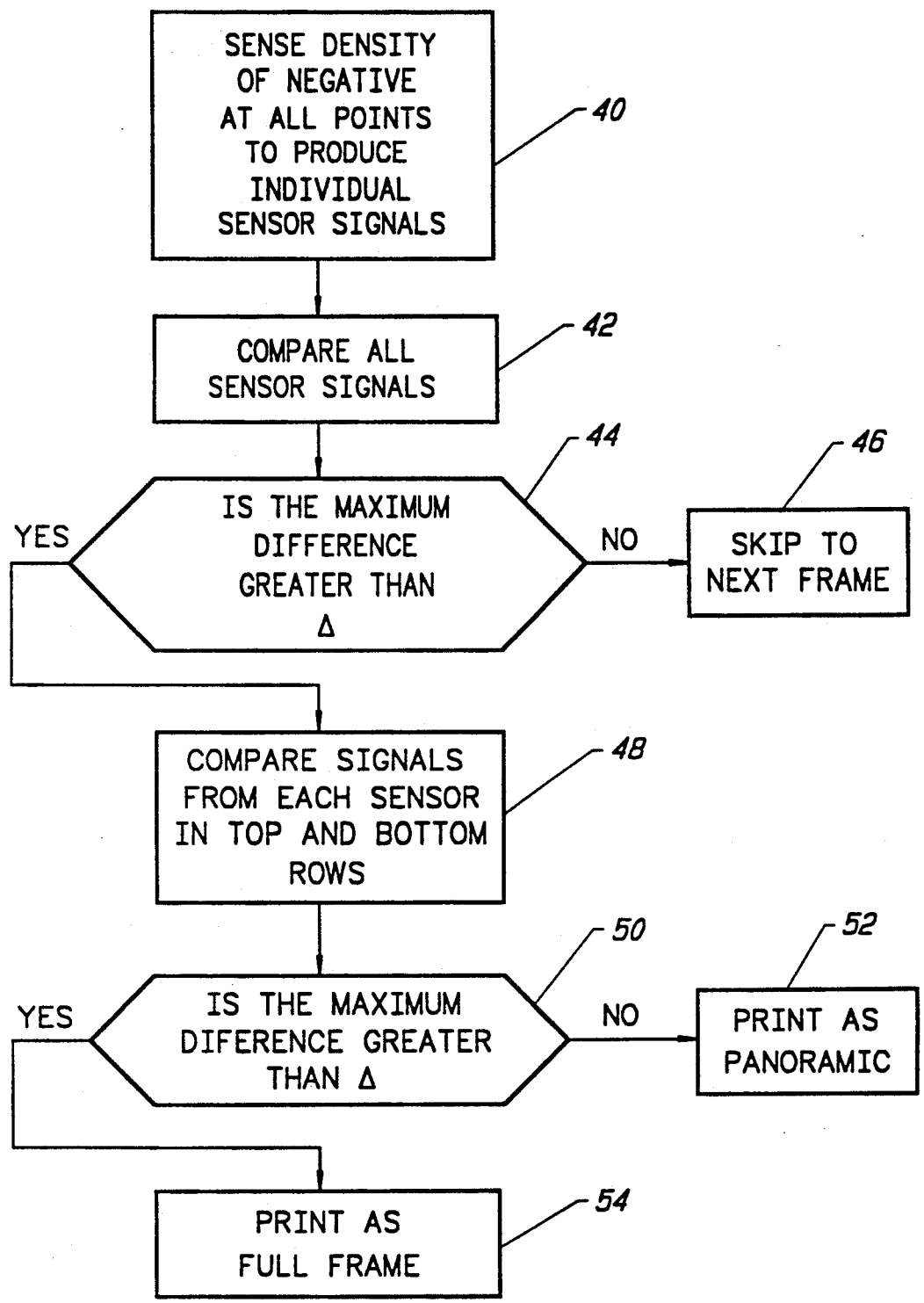
FIG. 4 is a flow diagram which represents a computer program (algorithm logic) forming part of the printing apparatus of FIG. 1.

Still referring to FIG. 4 in conjunction with FIGS. 1-3, if printer control 38 determines that the maximum difference between any two spots in groups 34a and 34b is greater than preselected difference $\Delta$, the negative at station 16 will be printed in the full frame format, as indicated by blocks 50 and 54. As a result, printer control 38 must place zoom lens 22 and paper mass 28 in their full frame format and provide photographic paper 24 in the appropriate length, after which the negative can be printed and thereafter moved out of station 16.

It should be clear from the foregoing that photographic printing apparatus 10 provides an automatic technique for processing both full frame and panoramic prints from a roll of film containing negatives which have been selectively exposed in either full frame or panoramic format. All of the individual components making up the apparatus are either readily available or readily providable in view of the teachings herein. The present invention does not reside in any of these components individually, but rather in their combination including, in particular, the way in which printer control 38 processes the information provided from classification scanner 32 in order to distinguish negatives containing full frame images from those containing panoramic images. The level of difference $\Delta$ is set such that it is small enough to not be fooled by very plain scenes (sky, snow, etc.) large enough to allow for some variation in density of fully masked or fully fogged film.

We claim:

1. A photographic printing apparatus for processing both full frame and panoramic prints from a roll of film containing negatives which have been selectively exposed in either full frame or panoramic format, said apparatus comprising:

(a) means defining a printing station for receiving a given negative;
   (b) means for electro-optically determining the density of said given negative at a number of sensing points on the negative when the latter is at said printing station;
   (c) format status determining means responsive to the density of said given negative at said sensing points for determining if negative contains a full frame image or a panoramic image, or is blank or entirely fogged and therefore contains no image, depending upon the density of said given negative at said sensing points, and
   (d) means for automatically
      (i) making a print from said negative in the full frame format if the given negative is determined to contain a full frame image or in the panoramic format if the given negative is determined to contain a full frame image or in the panoramic format if the given negative is determined to contain a panoramic image, or
      (ii) moving said given negative out of said print station without making a print if the negative is determined to be a blank or entirely fogged.

2. An apparatus according to claim 1 wherein said given negative and all of the other negatives contained within said roll of film are generally rectangular and therefor each includes top and bottom edge segments extending entirely across the negative and central segment therebetween, and wherein said density determining means is configured such that, when a given negative is at said printing station, a first group of said sensing points is located along the top edge segment of the negative, a second group of said sensing points is located along the bottom edge segment of the negative, and a third group of said sensing points is located within said central segment.

3. An apparatus according to claim 2 wherein said format status determining means includes means for producing:

(a) a first signal indicating that the given negative contains a full frame image if it is determined that there are significant differences in densities between sensing points within said first and second groups,
   (b) a second signal indicating that the given negative contains a panoramic image if it is determined that there are significant differences in densities between sensing points within said third group but no significant differences in densities between sensing points within said third group but no significant differences in densities between sensing points within said first and second groups, and
   (c) a third signal indicating that the given negative is a blank or entirely fogged if it is determined that there are no significant differences in densities between sensing points in any of said groups.

4. An apparatus according to claim 3 wherein said print making or negative moving means includes means responsive to one of said signals from said format status determining means for either making a print of a particular one of said formats or moving said given negative, depending upon said signal.

5. An apparatus according to claim 4 wherein said sensing points are discrete, spaced apart points and wherein said density determining means includes an electro-optical density sensing arrangement including discrete density sensing elements, one for each of said sensing points, each of said sensing elements generating at an output through a signal which is representative of one density of the given negative at the sensing point corresponding to that particular sensing element.

6. An apparatus according to claim 5 wherein said first and second groups of sensing points include a first and second rows of spaced apart points extending entirely across the top and bottom edge segments of said given negative, respectively and wherein said third group of sensing points includes a plurality of rows of spaced apart points, each last-mentioned row extending entirely across the control segment of said given negative.

7. A method of processing both full frame and panoramic prints from a roll of film containing negatives which have been selectively exposed in either full frame or panoramic format, said method comprising the steps of:

(a) defining a printing station for receiving a given negative;

(b) electro-optically determining the density of said given negative at a number of sensing points on the negative when the latter is at said printing station;

(c) by responding to the density of said given negative at said sensing points, determining if negative contains a full frame image or a panoramic image, or is blank or entirely fogged and therefore contains no image, depending upon the density of said given negative at said sensing points, and (d) thereafter automatically (i) making a print from said negative in the full frame format if the given negative is determined to contain a full frame image or in the panoramic format if the given negative is determined to contain a full frame image or in the panoramic format if the given negative is determined to contain a panoramic image, or (ii) moving said given negative out of said print station without making a print if the negative is determined to be a blank or entirely fogged.

8. A method according to claim 7 wherein said given negative and all of the other negatives contained within said roll of film are generally rectangular and therefor each includes top and bottom edge segments extending entirely across the negative and central segment therebetween, and wherein as part of said density determining step, when a given negative is at said printing station, a first group of said sensing points is located along the top edge segment of the negative, a second group of said sensing points is located along the bottom edge segment of the negative, and a third group of said sensing points is located within said central segment.

9. A method according to claim 8 wherein said image determining step includes producing:

(a) a first signal indicating that the given negative contains a full frame image if it is determined that there are significant differences in densities between sensing points within said first and second groups, (b) a second signal indicating that the given negative contains a panoramic image if it is determined that there are significant differences in densities between sensing points within said third group but no significant differences in densities between sensing points within said third group but no significant differences in densities between sensing points within said first and second groups, and (c) a third signal indicating that the given negative is a blank or entirely fogged if it is determined that there are no significant differences in densities between sensing points in any of said groups.

10. A method according to claim 9 wherein said print making or negative moving step includes responding to one of said signals from said image determining step for either making a print of a particular one of said formats or moving said given negative, depending upon said signal.

* * * * *

UNITED STATES PATENT AND TRADEMARK OFFICE
CERTIFICATE OF CORRECTION

PATENT NO. : 5,289,229
DATED : February 22, 1994
INVENTOR(S) : J.A. Manico et al It is certified that error appears in the above-indentified patent and that said Letters Patent is hereby corrected as shown below:

In Column 6, lines 18–20, delete "if the given negative is determined to contain a full frame image or in the panoramic format"

In Column 7, lines 38–40, delete "if the given negative is determined to contain a full frame image or in the panoramic format"

Signed and Sealed this

Twenty-sixth Day of July, 1994

Attest:

BRUCE LEHMAN

*Attesting Officer*  *Commissioner of Patents and Trademarks*